United States Patent Office 3,476,599
Patented Nov. 4, 1969

3,476,599
METAL CLEANING COMPOSITION
AND METHOD
Horace N. Grover, Hudson, and John G. Sommer,
Cuyahoga Falls, Ohio, assignors to The General
Tire & Rubber Company, a corporation of Ohio
No Drawing. Filed Sept. 12, 1966, Ser. No. 578,482
Int. Cl. B08b 7/00
U.S. Cl. 134—4     10 Claims

ABSTRACT OF THE DISCLOSURE

A method and composition for removing stains and other contaminants from processing equipment used in the milling, blending, forming, molding, etc., of polymeric materials, particularly elastomers. The composition, comprising a blend of a polymer and a cleaning agent typically composed of hydrocarbon molecules having amino and/or hydroxy groups, is processed through the equipment to accomplish cleaning of the same.

BACKGROUND

In the production of high-volume, high-compliance elastomeric components such as hydraulic brake cups, trimless transfer molds are typically used. These molds are machined to a very close tolerance and the mating surfaces thereof are typically chrome plated. Because of the necessity of maintaining extremely close dimensions on the finished molded parts, it is imperative that the molds be kept very clean. A dirty mold will result in the production of a poor surface on the molded part, and/or will prevent the proper engagement of the portions of the mold when closed, resulting in the production of a small web around the part, this web being referred to as "flash."

It is a common practice to clean the exposed surfaces of the mold after each curing cycle by brushing or by blowing with air to remove contaminants and rubber particles not firmly bonded to the mold. Furthermore, the molds are periodically removed from the production line for a more thorough cleaning. A mild abrasive is often used for the cleaning operation, and this sometimes results in the mold surfaces becoming abraded and worn. When this occurs, the mold surfaces must be refurbished. Refurbishment of a mold is an expensive operation and results in additional expenses because of the down-time of the mold and the inactivity of the mold operator.

In addition to trimless transfer molds, many other types of processing equipment such as screw and ram extruders, compression and injection molds, Banburys and other sigma blade mixers, etc., are commonly used in the testing and production of molded and extruded products of elastomers and other polymers. Objectionable build-up of contaminants is a difficulty that is encountered in the use of all of this equipment, and the removal of these contaminants is an expensive and time-consuming task.

It is one object of this invention to overcome some of the objections encountered in the cleaning of processing equipment including high compliance molds.

It is another object of the invention to permit cleaning of the molds and other processing equipment without the necessity of shutting down or removing the equipment from the production line.

Another object is the method of chemically cleaning a metal surface using a polymer containing an organic cleaning agent having at least one amino and/or hydroxy group on the hydrocarbon chain.

Yet another object of the invention is a composition and a method for cleaning metal molds wherein a specially prepared elastomeric composition having cleaning properties is introduced into the mold, is processed through a curing cycle, and is then removed therefrom along with the mold contaminants.

DESCRIPTION OF THE INVENTION

These and other objects are accomplished by preparing a polymeric composition containing a substantial but minor amount of an organic cleaning agent, contacting the contaminated metal surface with the polymeric composition, and permitting the agent to react and decontaminate the surface. The cleaning of equipment such as mixers, extruders and the like is typically achieved by processing the composition through the equipment in the same manner as that used to process the normal production material.

In a specific embodiment of the invention, a mold is cleaned by charging a composition containing less than about 80 parts of an organic cleaning agent per 100 parts of a suitable polymer into the mold and thereafter curing the composition, typically at elevated temperatures. This composition, which preferably contains adequate amounts of a filler such as silicon dioxide or carbon black is then discharged from the mold taking with it the stain and contaminants.

The success of the present invention is predicated upon the proper selection of an organic compound as a cleaning agent. Several factors are considered in the selection of this compound, among them the cleanability, toxicity, effect on cure (where applicable), and cost. Preferably the cleaning agent should contain an amino group and a hydroxy group. The most effective cleaning agents, including 2-amino-2-methyl-1-propanol, polyglycolamine which is a polyethylene oxide derivative of propanol amine and which has the formula

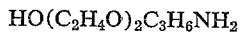
$$HO(C_2H_4O)_2C_3H_6NH_2$$

and N(2-hydroxy-ethyl)piperazine, contain both of these groups on the same molecule. It has been found that when at least 30 parts, and preferably 50 parts or more, of any one of these compounds are blended with 100 parts of a suitable elastomer and at least 40 parts, and preferably between 75 and 125 parts, of a filler such as silicon dioxide ($SiO_2$), an elastomeric composition having outstanding metal cleaning properties, when processed through a mold or other equipment, is produced.

In addition to the above-mentioned agents, others which show a very noticeable cleaning effect on molds and other processing equipment include blends of amino-containing and hydroxy-containing compounds. For instance, when a mixture of 20 to 40 parts of tetra ethylene pentamine and 20 parts of hexylene glycol or 40 parts of amino ethyl piperazine and 20 parts of ethylene glycol are blended with 100 parts of an elastomer along with suitable fillers, a very good cleaning compound is produced.

Other organic compounds which have been found to have moderate effectiveness as a cleaner when blended with a polymer include the following:

N-aminoethylpiperazine
N-aminoethylethanolamine
Monoisopropanolamine
Triethanolamine
N,N'-bis-aminopropyl piperazine
N-methylethanolamine
2-(hydroxyethoxy)-1-aminoethane
Ethyl lactate
2-aminoethylpropanediol
Diethanolamine soap
N-dimethylethanolamine
N-butyldiethanolamine
N-butylethanolamine
Tetraethylene pentamine The effectiveness of the cleaning composition appears to be dependent upon several factors. One of them is the presence of both an amino group and a hydroxy group, preferably on the same molecule. Secondly, hydrocarbons containing at least one primary hydroxy group along with at least one amino group exhibit stronger cleaning properties than do those containing secondary or tertiary hydroxy groups.

The primary function of the polymer in the cleaning composition of the present invention is that of a carrier for the cleaning agent. Accordingly, when a mold is cleaned, the contaminants which are removed from the metal surface by the cleaning agent become embedded in the polymer during curing and can thereafter be readily removed from the mold at the end of the curing cycle. Generally, the cured contaminated polymer is discarded after use although it is contemplated that under certain circumstances it can be reused. An inexpensive elastomeric rubber such as styrene-butadiene rubber is preferred. However, other curable polymers such as natural rubber, nitrile-butadiene, polybutadiene, polychloroprene, and ethylene propylene copolymer can also be used. Furthermore, other polymers even though they do not undergo complete vulcanization, can be used to clean molds, it being recognized that an incomplete cure renders it more difficult to remove the elastomer from the mold at the end of the cycle. Room curing polymers, as well as those requiring heat for vulcanization, can be used. When the cleaning composition of this invention is used to clean other processing equipment, a non-curing polymer, for instance, a thermoplastic material such as polyvinylchloride, can be utilized as a carrier.

Suitable fillers such as carbon black or silicon dioxide can be used in amounts ranging from between approximately 40 and approximately 125 parts per 100 parts of polymer. It has been found that the addition of a cleaning agent to an elastomer tends to lower the viscosity of the elastomer. The addition of fillers to the elastomer tends to increase the Mooney viscosity thereof, thereby balancing the effect of the agent. It may be found desirable to use a light colored filler such as silicon dioxide along with a small amount of a pigment such as titanium dioxide to render the cleaning composition readily identifiable and distinguishable from the normal production elastomer compounds containing carbon black. Alternatively, if the production item is light colored, the use of carbon black in the cleaning compound will make it easily identifiable. Generally, the amount of filler will be proportionate to the amount of the cleaning agent. In other words, higher amounts of cleaning agent will require more filler to offset the tendency to reduce the viscosity. It is also contemplated that other fillers such as clay may be used as a partial or total replacement for $SiO_2$ or carbon black with the understanding that much greater amounts, i.e., over 200 parts, may be necessary to maintain a satisfactory viscosity of the compound. This is apparently due to the ability of the carbon black and $SiO_2$ to absorb and retain greater amounts of the cleaning agent than can clay. This phenomenon of absorption apparently also retards the tendency of the cleaning agent to bleed out of the compound during storage.

In order to provide a clearer understanding of the present invention, but without limiting the scope thereof, the following examples are presented herewith.

Example I

An elastomeric cleaning composition having the following formulation:

| | Parts by weight |
|---|---|
| Styrene-butadiene rubber (SBR) | 100 |
| Zinc oxide | 3 |
| Stearic acid | 1 |
| Filler and pigment ($SiO_2$ and $TiO_2$) | 85 |
| Curatives (curing agents and accelerators) | 6 |
| H-163 [1] | 45 |

[1] H-163 is a polyglycolamine distributed by the Union Carbide Corporation having the formulation $HO(C_2H_4O)_2C_3H_6NH_2$ and the generic name aminopropyl mono-ether of diethylene glycol.

was prepared in the following manner. The rubber was processed on a 2-roll rubber mill at a temperature of between 120 and 125° F., after which the stearic acid and ZnO were added in that order. The filler, pigment, and H-163 were preblended and were slowly added to the mill and blended with the rubber. The curing agents and accelerators were then added followed by additional blending to insure homogeneity. The composition contained greater amounts of curatives than would normally be required for an elastomeric composition inasmuch as the polyglycolamine tends to have a strong retarding effect upon the cure.

The composition was introduced into a compression mold, the exposed surfaces of which were chrome plated and were heavily stained through prior use. After a four-minute cure at 360° F., accompanied by the release of some fumes, the elastomer was removed from the mold and visual inspection of the mold surface showed that it was very clean. The H-163 showed some tendency to bleed out of the composition during storage, a factor that could be corrected by the addition of more filler.

Example II

The following formulation was prepared in the same manner as that described in Example I and was tested on chrome plated steel transfer molds.

| | Parts by weight |
|---|---|
| SBR rubber | 100 |
| Filler and pigment | 50 |
| Peroxide curing agent | 3 |
| 2-amino-2-methyl-1-propanol | 40 |

This cleaning agent was introduced into a badly stained transfer mold and was cured at elevated temperatures for several minutes. It successfully removed the stains and other contaminants from the mold. By varying the amount of cleaner in the formulation, it was found that the composition would work satisfactorily on the mold upon the incorporation of as much as 60 parts of 2-amino-2-methyl-1-propanol per 100 parts of rubber. Furthermore, with as little as 30 parts of cleaner in the formulation, it was found to adequately clean aluminum molds as well. The storage properties of the cleaning composition are good, and its odor during curing was not found to be particularly objectionable. Generally, less filler is required when using 2-amino-2-methyl-1-propanol than with polyglycolamine.

Example III

Another composition was prepared similar to that of Example I, but instead of H–163, a blend of 40 parts of tetraethylene pentamine and 20 parts of hexylene glycol were used. This composition was introduced into a mold and was cured at 360° F. for four minutes. It was very effective at cleaning the mold but left some of the stain on the mold. Reducing the amount of tetraethylene pentamine to 20 parts appeared to improve the ability of the composition to remove mold stains.

Although it is contemplated that the curable cleaning composition will be discarded after its use, it is possible to rework the stock, upon removal from the mold, and to thereafter reuse it, particularly if it is not completely cured during the cleaning operation. In fact, it has been found that elastomeric compositions containing styrene-butadiene rubber and polyglycolamine can be used under conditions of partial cure and can be reworked four or more times with only a slight decrease in effectiveness after each use.

Although the invention has been described in connection with its use in cleaning molds, it should be understood that it is likewise applicable to the cleaning of other metallic objects which have become stained, coated, or contaminated with residues of elastomeric or polymeric decompositions. Furthermore, its use is not restricted to chrome plated surfaces but can likewise be used on unplated surfaces of steel, aluminum, and other metals. In fact, its use is limited only by the compatibility of the composition with the metal at the temperatures employed to effect cleaning of the equipment.

Although the composition of the present invention preferably contains at least 30 parts of an organic cleaning agent per 100 parts of polymer, it has been found that 10 or 20 parts can be used with some degree of effectiveness, particularly when a relatively non-absorptive filler such as clay is used in place of carbon black or $SiO_2$. Therefore, these compositions are also contemplated as being covered by the present invention.

It is furthermore contemplated as being within the scope of this invention that the organic cleaning agent can be added in very minor amounts, say one to five parts, per 100 parts of polymer to the product formulation to provide continuous cleaning of the mold or other processing equipment. This is particularly applicable where the various physical properties of the finished product would not be adversely affected by the inclusion of this cleaning agent.

The foregoing discussion, including the examples, is intended to give a clear and concise description of the invention, the scope of which is delimited by the following claims in which we claim:

1. The method of removing stains and other residues, representing the decomposition products of polymers and compounding ingredients, from a metal surface comprising:
   (a) covering said metal surface with a layer of a polymeric composition consisting essentially of a moldable polymer and between about 1 and about 80 parts per 100 parts of said moldable polymer of at least one organic cleaning compound having at least one functional amino group and at least one functional hydroxy group thereon, and
   (b) maintaining the layer in contact with said metal surface for a sufficient length of time to loosen the stains and other residues from said surface.

2. The method according to claim 1 wherein one organic cleaning compound, having at least one hydroxy group and at least one primary amino group on the same molecule, is used.

3. The method according to claim 2 wherein the compound is selected from the group consisting of 2-amino-2-methyl-1-propanol, aminopropyl mono-ether of diethylene glycol and N(2-hydroxy-ethyl) piperazine.

4. The method of cleaning the metal surface of a mold used to mold polymeric composition comprising:
   (a) completely filling the mold with a polymeric composition containing a heat curable, moldable polymer and, per 100 parts by weight of said polymer, between about 1 and about 80 parts of an organic cleaning agent composed of at least one hydrocarbon compound containing at least one active amino group and at least one active hydroxy group on each molecule,
   (b) heating the mold for a sufficient length of time to permit the cleaning agent to decontaminate the metal surface and to at least partially cure the polymeric composition, and
   (c) removing the polymeric composition, containing the contaminants and the at least partially cured polymeric composition from the mold.

5. The method of claim 4 wherein the cleaning agent comprises one hydrocarbon compound containing an active amino group and an active hydroxy group on the same molecule.

6. The method according to claim 5 wherein the hydrocarbon compound is selected from the group consisting of 2-amino-2-methyl-1-propanol, aminopropyl mono-ether of diethylene glycol and N(2-hydroxy-ethyl) piperazine.

7. The method according to claim 4 wherein the cleaning agent is used in an amount of between about 1 and about 5 parts per 100 parts by weight of a production polymeric composition to continuously clean the metal surface of the mold.

8. The method according to claim 4 wherein the polymer in the composition is an elastomer, the organic cleaning agent is used in an amount of between about 30 and about 60 parts per 100 parts of elastomer, the polymeric composition contains between about 40 parts and about 150 parts of a filler selected from the group consisting of $SiO_2$ and carbon black, and the composition is introduced periodically into the mold to clean the same.

9. A formulation for cleaning the metal surface of equipment used to process compositions containing elastomers and other polymers wherein the metal surfaces are subjected to contamination due to decomposition and oxidation of the compositions at elevated temperatures, said formulation comprising a polymeric material containing a curable polymer and, on the basis of 100 parts of said curable polymer, between about 1 and about 80 parts of at least one cleaning agent consisting of a first organic compound selected from the group consisting of tetraethylene pentamine and N-aminoethyl piperazine, and a second organic compound selected from the group consisting of ethylene glycol and hexylene glycol.

10. A composition for use in cleaning the metal surface of a mold and other equipment used to process elastomeric materials at elevated temperatures wherein decomposition of the materials causes contamination of the metal surfaces, consisting essentially of:
   (a) 100 parts of a solid curable polymer,
   (b) between about 40 and about 150 parts of an inorganic filler selected from the group consisting of $SiO_2$ and carbon black, and
   (c) between about 20 and about 80 parts of an organic cleaning compound containing at least one amino group and at least one hydroxy group and selected from the group consisting of:
   2-amino-2-methyl-1-propanol
   aminopropyl mono-ether of diethylene glycol
   N-(2-hydroxy-ethyl) piperazine
   N-aminoethylethanolamine
   monoisopropanolamine
   triethanolamine
   N-methylethanolamine
   2-(hydroxyethoxy)-1-amino ethane
   2-aminoethylpropanediol
   diethanolamine soap N-dimethylethanolamine
N-butyldiethanolamine, and
N-butylethanolamine.

References Cited
UNITED STATES PATENTS

| | | |
|---|---|---|
| 1,622,122 | 3/1927 | Rabe _____ 8—59 |
| 2,163,611 | 6/1939 | MacDonald. |
| 2,460,600 | 2/1949 | Sarbach. |
| 2,643,981 | 6/1953 | Kelly. |
| 2,650,909 | 9/1953 | Betch et al. _____ 260—32.2 XR |
| 3,031,408 | 4/1962 | Perlman. |
| 3,079,284 | 2/1963 | Boucher et al. _____ 134—30 XR |
| 3,082,108 | 3/1963 | Sirota. |
| 3,085,916 | 4/1963 | Zimmie _____ 134—22 |
| 3,171,821 | 3/1965 | Sherman. |
| 3,254,043 | 5/1966 | Trott. |
| 3,282,867 | 11/1966 | Stahly. |

MORRIS O. WOLK, Primary Examiner

D. G. MILLMAN, Assistant Examiner

U.S. Cl. X.R.

134—8, 22; 252—119, 154; 264—39, 169